United States Patent
Steinbusch et al.

(10) Patent No.: US 7,234,134 B2
(45) Date of Patent: Jun. 19, 2007

(54) SYSTEM FOR EXECUTING VIRTUAL MACHINE INSTRUCTIONS

(75) Inventors: Otto Lodewijk Steinbusch, Eindhoven (NL); Menno Menasshe Lindwer, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 540 days.

(21) Appl. No.: 09/942,001

(22) Filed: Aug. 29, 2001

(65) Prior Publication Data

US 2002/0053072 A1    May 2, 2002

(30) Foreign Application Priority Data

Aug. 31, 2000  (EP)  ................. 00203024

(51) Int. Cl.
    *G06F 9/45* (2006.01)
(52) U.S. Cl. .................. 717/139; 717/148
(58) Field of Classification Search ........... 717/140, 717/148, 160, 150, 139; 712/241, 243
    See application file for complete search history.

(56) References Cited

U.S. PATENT DOCUMENTS

| | | | |
|---|---|---|---|
| 5,768,593 A * | 6/1998 | Walters et al. | 717/141 |
| 5,872,978 A * | 2/1999 | Hoskins | 717/158 |
| 5,889,996 A | 3/1999 | Adams | 395/705 |
| 6,266,807 B1 * | 7/2001 | McGarity et al. | 717/148 |
| 6,332,215 B1 * | 12/2001 | Patel et al. | 717/141 |
| 6,513,156 B2 * | 1/2003 | Bak et al. | 717/151 |
| 6,546,550 B1 * | 4/2003 | Ogata et al. | 717/148 |

FOREIGN PATENT DOCUMENTS

WO    9918486 A2    4/1999

OTHER PUBLICATIONS

Gokhale, Maya, Stone, Janice M., "NAPA C: Compiling for a Hybrid RISC/FPGA Architecture", 1998, IEEE, retrieved Aug. 4, 2004.*
Hsieh, Cheng-Hseueh A., Conte, Marie T., Johnson, Tereas L., Gyllenhaal, John C., Hwu, Wen-mei W., "A Study of the Cache and Branch Performance Issues with Running Java on Current Hardware Platforms", p. 211-216, IEEE 1997, retrieved Aug. 4, 2004.*
Newhall, Tia, Miller, Barton P., "Performance Measurement of Dynamically Compiled Java Executions", p. 42-50, ACM 1999, retrieved Aug. 4, 2004.*

* cited by examiner

Primary Examiner—Mary Steelman

(57) ABSTRACT

A data processing system has a processor core, memory and a virtual machine interpreter. The virtual machine interpreter receives virtual machine instructions selected dependent on program flow during execution of a virtual machine program. The virtual machine interpreter generates native machine instructions that implement the virtual machine instructions for execution by the processor core. The virtual machine interpreter identifies an initial virtual machine instruction from a body of virtual machine instructions, where the body is expected to be executed repeatedly. The virtual machine interpreter records a correspondence between the initial virtual machine instruction in the body and a memory location in the memory and writes native instructions for the body into the memory from said memory location. The processor core executes the native instructions for the body and repeats execution of the native instructions for the body by executing the written native machine instructions for the body from memory starting from said memory location.

6 Claims, 2 Drawing Sheets

SYSTEM FOR EXECUTING VIRTUAL MACHINE INSTRUCTIONS

Figure 1:
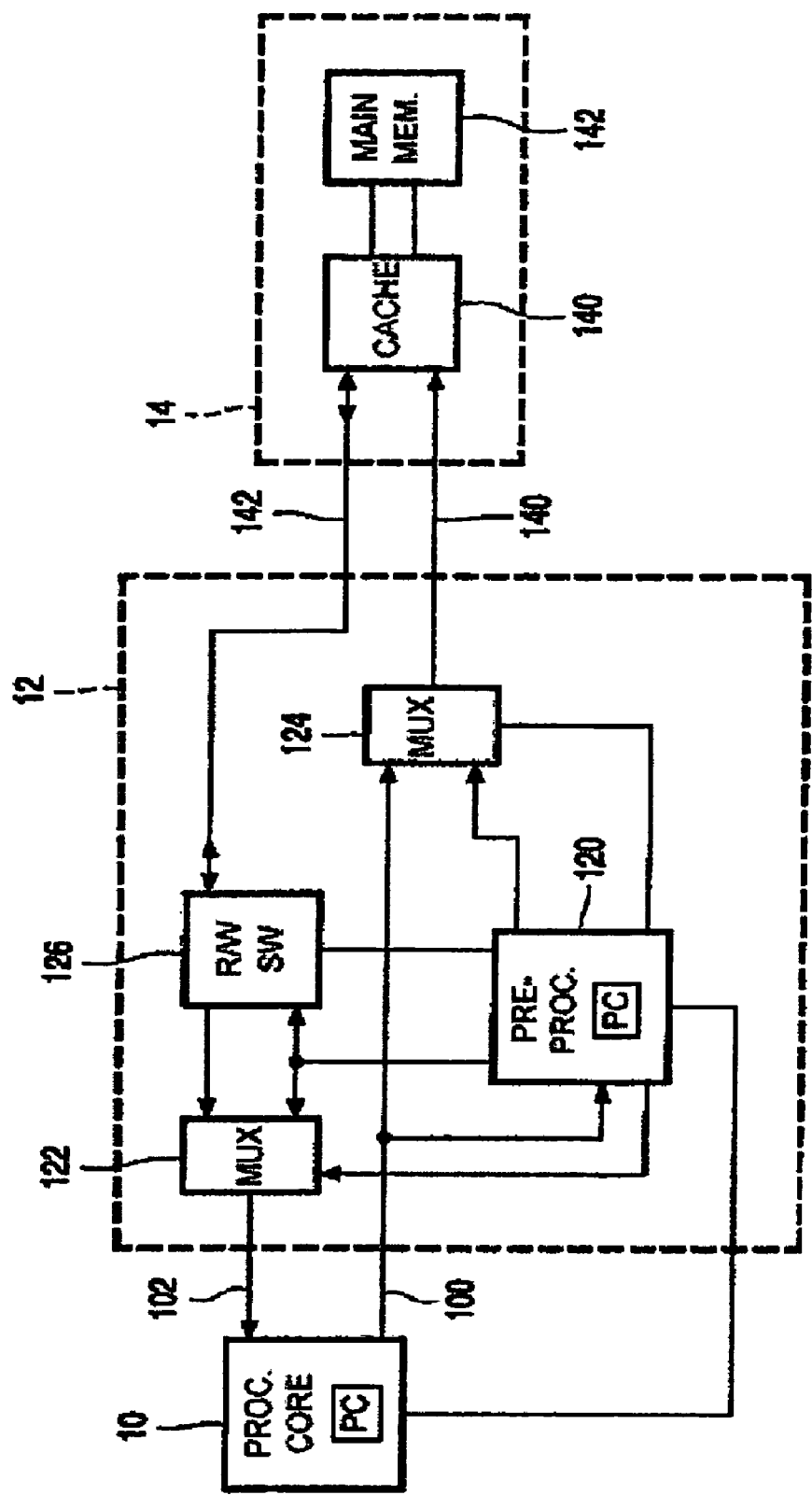

The field of the invention is a method and device for executing a program of virtual machine instructions with a processor core that is arranged to execute native instructions different from the virtual machine instructions.

Execution of a virtual machine program can be used under various circumstances, such as during execution of compiled JAVA programs or when execution of the program by a processor has to be emulated by a processor with a different instruction set.

In case of JAVA, a program in the JAVA language is first compiled into a program of JAVA virtual machine instructions, instructions, which are commonly called JAVA byte codes. Compilation may be performed once for a number of executions, or "Just-In-Time" (JIT), just before execution of the JAVA program or blocks of the JAVA program. The program or block is compiled into JAVA virtual machine instructions, loaded into memory and execution of the byte codes by a processor is started. The processor has to ensure that the effect is produced that has been defined for those byte codes in the JAVA language definition.

Execution of a virtual machine program can be realized with an interpreter, which is implemented for example by executing an emulator program with the processor or by inserting a preprocessor between instruction memory and a processor core. An interpreter program contains native machine instructions to load the virtual machine instructions, to determine what actions to take in order to produce the effect required by the virtual machine instructions and to take those actions. Similarly a preprocessor inspects the virtual machine instructions and generates instructions for the processor core that produce the required effect.

In both cases virtual machine instructions are loaded and translated "on the fly": each virtual machine instruction is translated into one or more native machine instructions when this virtual machine instruction has to be executed (or when it is expected that it has to be executed soon). Program flow during execution dictates which virtual machine instructions are translated. To realize this, the emulator has to maintain a virtual program counter, which the emulator must increment during sequential instruction execution or which the emulator must change upon executing a virtual machine branch instruction.

Usually, emulation of execution of a program of virtual machine instructions is much slower than execution of a similar program of native instructions. It has been known to speed up processing by providing a library of programs of native instructions to implement certain tasks. When a program of virtual machine instructions calls for the execution of such a task, a program from the library is given control over the processor, so that the task is executed much faster, without the supervision of the emulator. JIT compilers are another way of speeding up VM execution. However, they consume much more memory, because they need to store both VM code and translated code. Besides that, their timing behaviour is inpredictable, because the execution phase in which the actual translation takes place is very slow.

From PCT patent application No. 99/18486 a preprocessor is known for implementing the execution of virtual machine programs. This preprocessor is capable of switching very rapidly between execution of virtual machine instructions and native machine instructions. The preprocessor monitors the program counter of the processor core. Certain ranges of program counter values have been defined for virtual machine instructions and for native machine instructions. As long as the program counter is in a range defined for native machine instructions, the preprocessor is passive and the bus control unit allows native instructions addressed by the program counter to be fetched from memory to the processor. When the program counter is in a range defined for virtual machine instructions, the preprocessor steps in. In this case, the native instructions for the processor core are no longer fetched from memory. The preprocessor loads virtual machine instructions from memory and from these virtual machine instructions it generates the native machine instructions. When a virtual machine instructions calls for execution of a task that is implemented as a library program of native machine instructions, the preprocessor causes the processor core to change the program counter of the processor core to the starting point of the program of native machine instructions. This speeds up execution of programs of such native machine instructions, but execution of virtual machine instructions is still much slower.

U.S. Pat. No. 5,889,996 describes an interpreter which contains different blocks of native machine instructions, each block for a respective type of the virtual machine instruction. According to this patent these blocks are all loaded into cache memory together and each time the interpreter executes a virtual machine instruction the interpreter transfers control to the appropriate block. Thus, program execution is accelerated because the required native machine instructions can be fetched from cache memory. However, virtual machine program execution is still slower than native machine program execution.

Among others, it is an object of the invention to provide for a method and device for executing virtual machine programs that speeds up execution of virtual machine programs.

The device according to the invention is set forth in claim 1 and the method according to the invention is set forth in claim 5. At least part of a body of native machine instructions that are generated to implement virtual machine instructions that are expected to be executed repeatedly is identified. Thus at least part of the body is written to memory, preferably starting from the first native machine instruction that corresponds to the virtual machine instruction at the start of a loop, a loop being a set of one or more instructions which is to be executed repeatedly. The emulator records a correspondence between a memory location of the start of the at least part of the body and an identity of the virtual machine instruction corresponding to the start of the at least part of the body. Subsequently the emulator enables the processor core to execute native machine instructions of the at least part of the body repeatedly from memory, without generating these native instructions anew for each repeated execution of the corresponding virtual machine instructions. Preferably, the body is kept in a cache memory.

A preferred example of a body of native machine instructions that is expected to be executed repeatedly is a loop, where the repeated executions of the body are consecutive, without execution of intervening instructions. But the invention may also be applied to bodies of instructions that are not a loop body, but are expected to be executed repeatedly for another reason, for example a subroutine body. In case of a loop, the entire body of the loop is preferably stored. Furthermore, a backward branch native machine instruction is preferably generated and stored in memory at the end of the body of native machine instructions, so that the loop can be executed repeatedly without further intervention of the emulator. As an alternative, the emulator might generate native instructions for part of the loop anew for each time that the loop is executed. This reduces the efficiency of execution, but it may be advantageous, for example if some instructions in the loop require special treatment by the emulator.

Preferably, the emulator detects from the instruction fetch addresses of the processor core whether the processor core is still executing instructions from the body, or whether the program counter passes out of the body. In the latter case, the emulator resumes the generation of native machine instructions. In principle, the emulator can detect that the instruction fetch address of the processor core passes out of the body if the emulator stores an address of the end of the body and compares this address with the instruction fetch address. Preferably, however the emulator adds a branch instruction at the end of the body, for causing the processor core to branch into some predefined range of addresses (for example a range where a predetermined bit of the address is equal to one, but any range within certain bounds will do). In this case, it suffices that the emulator detects whether the instruction fetch address is in that predefined range.

In principle, the native machine instructions in the body can be executed for the first time by the processor core as they are generated and stored by the emulator, that is, the native instructions can be executed before the instructions of the entire body have been generated and stored. In this case the processor core executes the native machine instructions of the body from memory only the second and further times the instructions are executed. However, in a preferred embodiment, the emulator first stores the entire body and then causes the processor core to start executing the generated instructions of the loop from memory. Thus, the processor core executes the body from memory also the first time. Thus, there is no need to treat the first execution of the loop different from other executions, which simplifies the operation of the emulator.

For the implementation of the invention it is necessary to record a correspondence between a native machine instruction at the start of the at least part of the body and a memory location where that native machine instruction is stored.

This may be realized for example by starting storage of generated native machine instructions for the at least part of the body from a predefined memory location, which is independent of the particular program being executed. In order that the emulator knows when to start storing the generated native machine instructions, the program of virtual machine instructions is preferably accompanied by hint information that indicates a virtual machine instruction at the start of a part of the program for which generated native machine instructions must be stored. This hint information may be in the form of an additional instruction in the program, or in the form of an entry in list that indicates the location virtual machine instructions at the start of such parts of the program. Such hint information may be compiled in advance, for example by analyzing the program to detect loops or subroutine bodies suitable for such treatment.

Alternatively, one may store native machine instructions more or less indiscriminately as they are generated during program execution, and record the combination of a location of virtual machine instructions in the program and a memory addresses of corresponding generated native machine instructions. Thus, when a virtual machine branch back instruction occurs, the emulator can use the virtual machine target location of the branch to determine the memory location where the corresponding native machine instructions start, so that the processor core can start executing these instructions from memory.

These and other advantageous aspects of the method and device according to the invention will be described using the following Figures, of which FIG. 1 shows an embodiment of a device according to the invention.

Figure 2:
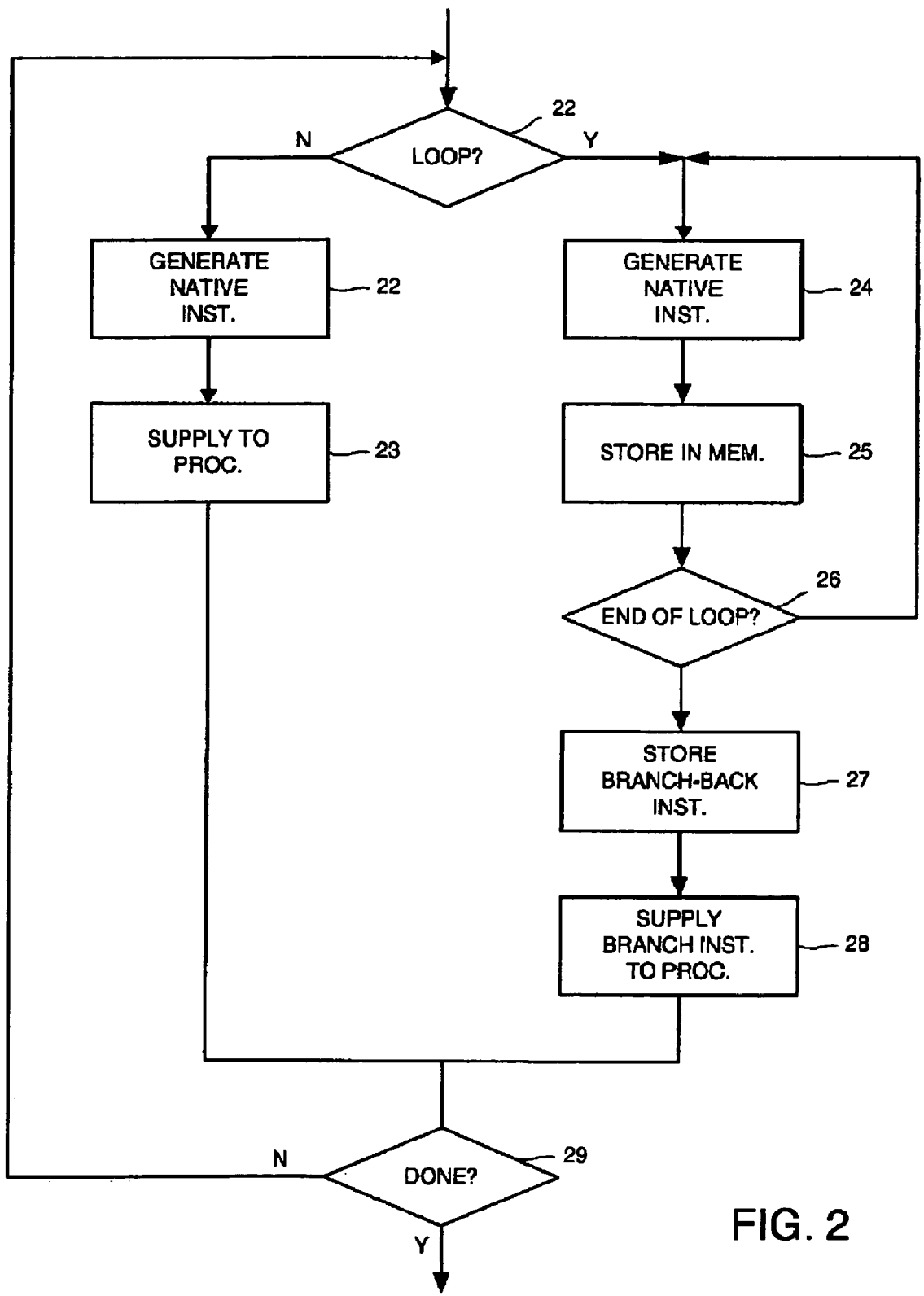

FIG. 2 shows a flow chart of emulation of a virtual machine program.

FIG. 1 shows an embodiment of a device according to the invention. The device contains a processor core 10, a memory system 14 and a virtual machine interpreter 12 between the memory system 14 and the processor core 10. The processor core 10 has an instruction address output 100 and an instruction input 102 coupled to the virtual machine interpreter 12. The memory system 14 has an address input 144 and a data input/output 146 coupled to the virtual machine interpreter 12. The memory system 14 is shown to contain a cache memory 140 and a main memory 142. For the sake of simplicity, connections for supplying operand data to processor core 10 are not shown in FIG. 1, because such connections are not essential for understanding the invention. Operand data may be supplied to the processor core 10 for example using a separate data memory (not shown), with its own data address and data value connection (not shown) to the processor core 10, or from memory system 14 in time share multiplexing with the supply of instructions. The system may have physically different memories for VM instructions and generated native instructions, provided that the processor core has read connections to the same memory to which the VMI has write connections.

The virtual machine interpreter 12 contains a preprocessor 120, an instruction multiplexer 122, an address multiplexer 124 and a read/write switch 126. Virtual machine interpreter 12 has control outputs coupled to control inputs of instruction multiplexer 122, address multiplexer 124 and read/write switch 126. The preprocessor 120 has an input coupled to the address output 100 of processor core 10, an address output coupled to the address input 144 of memory system 14 via address multiplexer 124, a virtual machine instruction input coupled to the data input/output 146 of memory system 14 and a native machine instruction output coupled to the instruction input 102 of the processor core 10 via the instruction multiplexer 122.

These connections serve a normal mode of operation of the virtual machine interpreter 12, in which the preprocessor 120 issues addresses of virtual machine instructions to the address input 140 of the memory system 14 via address multiplexer 124 and in response receives virtual machine instructions from the data input/output 142 of the memory system. The preprocessor analyzes the received virtual machine instructions, determines which native machine instructions should be executed by the processor core 10 to implement the received virtual machine instructions and supplies these native machine instructions to the instruction input 102 of the processor core 10 via instruction multiplexer 122.

The preprocessor 120 maintains its own virtual machine program counter (distinct from the program counter of the processor core 10), which determines the location in the program of the next virtual machine instruction that should be executed during program flow. In the normal mode, the preprocessor 120 itself handles virtual machine branch instructions, which affect the program counter in the preprocessor. No native machine instructions need be generated for this purpose, except to determine any conditions for the branch instruction. In principle, all virtual machine instructions can be processed in this way in the normal mode, including instructions in program loops which are executed repeatedly and subroutines. However, according to the invention, a special treatment may (not "need") be given to such parts of the program that are expected to be executed repeatedly.

In a loop mode of operation, the virtual machine interpreter 12 does not supply generated native machine instructions directly to the processor core 10. Instead, the virtual machine interpreter stores these instructions in memory system 14, by supplying storage addresses to the address input 140 of memory system 14 via address multiplexer 124 and by supplying the native instructions to the data input/output 142 via read/write switch 126. For this purpose, the native machine instruction output is coupled to the data input/output 142 of memory system 14 via the read/write switch 126.

In a native execution mode, the processor core 10 is allowed to execute native machine instructions from memory system 14. For this purpose, the instruction address output 100 of processor core 10 is coupled to the address input 140 of memory system 14 via address multiplexer 124. And instruction input 102 of processor core 1 is coupled to the data input/output 142 of memory system 14 via the instruction multiplexer 122.

FIG. 2 shows a flow-chart of operation of the virtual machine interpreter 12. In the normal mode, virtual machine interpreter 12 repeatedly executes a first, second and third step 21, 22, 23 until a final step 29 detects an end of the virtual machine program (or executes a byte code that has the effect of terminating execution of the virtual machine program). In the first step 21 of the flow-chart, the virtual machine interpreter loads a virtual machine instruction from memory system 14 and determines whether this instruction is a starting instruction of a loop. If not, virtual machine interpreter executes the second step 22. In the second step 22, the virtual machine interpreter 12 analyzes the virtual machine instruction that has been loaded in the first step 21 and generates one or more native machine instructions that implement the virtual machine instruction. The process of generation of native machine instructions has been described in PCT patent application No. 99/18486 cited hereinbefore and its references. In the third step 23, virtual machine interpreter supplies the generated native machine instruction or instructions to processor core 10 and monitors the instruction address output of processor core to determine when a next virtual machine instruction must be processed. When a next virtual machine instruction must be processed, the final step 29 is executed, to determine whether the program has finished. If not, the first, second and third step 21, 22, 23 are repeated. Alternatively, the return to the first, second and third step 21, 22, 23 is unconditional, an exit from the loop being realized by executing a software trap instruction in response to byte codes that cause the virtual machine program to terminate.

In the normal mode, the exact instruction address issued by the processor core is not used to address instructions. Virtual machine interpreter 12 keeps its own virtual machine program counter to control the addresses in memory system 14 from which it fetches virtual machine instructions. Virtual machine interpreter 12 may use the instructions addresses issued by processor core 10 to test the state of processor core 10, by supplying native conditional branch instructions to processor core 10 and observing whether or not processor core 10 takes the branch. Furthermore, virtual machine interpreter 12 may use the instruction address issued by the processor core 10 for the purpose of mode selection: at least two ranges of instruction addresses are defined, one for example having an MSB (most significant bit) equal to one. As long as the processor core 10 issues addresses in a first range, the virtual machine interpreter 12 operates in the normal mode translating virtual machine instructions as described. However, when the instruction addresses issued by the processor core 10 are not in the first range, the virtual machine interpreter operates in a different mode, for example a native mode, in which processor core 10 is allowed to fetch native instructions from memory system 14 for execution.

When virtual machine interpreter 12 determines in first step 21 that a starting instruction of a loop has been loaded, virtual machine interpreter 12 executes a fourth, fifth, sixth, seventh and eight step 24, 25, 26, 27, 28. The fourth step 24 is similar to the second step 22, in that one or more native machine instructions are generated that implement a current virtual machine instruction. However, in the fifth step 25, virtual machine interpreter 12 stores this native machine instruction or these native machine instructions in memory system 14, instead of executing them as in the third step 23. In the sixth step 26, virtual machine interpreter 12 loads a subsequent virtual machine instruction en repeats from the fourth step 24 if the subsequent virtual machine instruction is not the final instruction of the loop. Thus, virtual machine interpreter 12 stores a sequence of generated native machine instructions in memory system. When virtual machine interpreter 12 determines that it has reached the end of the loop of virtual machine instructions, the seventh and eight steps 27, 28 are executed. In the seventh step 27 virtual machine interpreter 12 stores a native conditional branch back instruction in memory system 14 at the end of the sequence of instructions that have been generated for the loop. After the branch back instruction, the native machine interpreter 12 stores an unconditional branch instruction to an instruction address in a predetermined range, for example the range from which the addresses, when issued by processor core 10, indicate that virtual machine interpreter 12 must operate in the normal mode.

In the eight step 28, virtual machine interpreter 12 supplies a branch instruction to processor core 10, to cause the processor core 10 to start fetching instructions from the sequence of native instructions that has been generated for the loop. In this respect, eight step 28 is similar to third step 23, except that in eight step 28 the processor core 10 addresses and executes native instructions from memory system 14, whereas in third step 23 the native instructions are generated by and supplied from virtual machine interpreter 12. In the eight step 28, virtual machine interpreter 12 allows processor core 10 to fetch and execute instructions from memory system 14 until virtual machine interpreter 12 detects from the value of the instruction address issued by the processor core 10 that the processor core 10 has exited from the loop. Thereupon, virtual machine interpreter 12 executes final step 29, to resume operation in the normal mode.

By way of example, the flow chart of FIG. 2 has been described for the case of a loop, which is executed immediately after generation of the native instructions and their storage in memory. This is the most compact example of implementation of the invention, but the invention may be applied to other sets of virtual machine instructions than loops, when such a set of virtual machine instructions are expected to be executed repeatedly. An example is the body of a subroutine, or an exception handler, or the most computation sensitive part of a larger loop. In these cases, the stored native machine instructions will not contain a branch back at the end of the generated instructions. Control is transferred back to the stored native machine instructions each time the virtual machine program calls for the execution of the corresponding series of virtual machine instructions.

In the embodiment shown in FIG. 2, the virtual machine interpreter 12 starts writing generated native machine instructions to memory system 14 only from the first native instruction generated for a set of repeatedly executed virtual machine instructions. The starting memory address from which virtual machine interpreter 12 starts writing these native machine instructions may be a predetermined memory address, which is independent of the virtual machine program being executed. This is advantageous, in that no unnecessary overhead is involved in writing native machine instructions generated for virtual machine instructions outside the loop. Furthermore, if the memory system 14 uses a cache, the required amount of cache replacement is reduced in this way.

However, this approach means that the virtual machine interpreter 12 needs a signal to indicate when it should start writing generated native machine instructions to the memory system 14. In case the virtual machine instructions include a "loop" instruction, which indicates that a specified number of virtual machine instructions must be executed a specified number of times, the loop instruction can be used as a trigger to start storing generated native machine instructions. Alternatively, a "meta-instruction" may be included in the virtual machine program to indicate the start of a body of instructions whose translation must be stored in memory. In this case, the meta-instruction causes the virtual machine interpreter 12 in the first step 21 to load the next virtual machine instruction and to proceed from the fourth step 24. The meta-instruction may indicate the size of this body of virtual machine instructions, but this is not necessary: the end of the body may be detected from a virtual machine branch back instruction with a branch target equal to the location of the start of the body. Alternatively, the virtual machine program may be combined with a list of addresses of virtual machine instructions at the start of such bodies. In this case, virtual machine interpreter loads at least part of this list and compares the current virtual machine instruction address in the first step 21.

The location of the virtual machine instruction may be determined for example during compilation of a high level language into virtual machine instructions, as the location where high level language loops (e.g. for loops) have been compiled. Alternatively, these locations may be determined by preprocessing the virtual machine instruction program, to detect branch back instructions and to mark the target of detected branch back instructions as starting points of loops. Thus, the high level language source code is not required. Similarly, the starting points of subroutines (targets of virtual machine jump to subroutine instructions) and/or instructions for catching exceptions may be marked in this way.

In the simplest embodiment, the execution of generated native instruction sequences from memory is applied only to native instruction sequences for sets of virtual machine instructions that do not contain branch instructions or other control transfer instructions other than a branch back at the end of the set. This guarantees that the same sequence of native instructions must be executed each time. If the set of virtual machine instructions contains a branch instruction that is not at the end of the set a number of measures can be taken. A first solution is to execute the set in the normal mode, i.e. by translation each time the virtual machine instructions are executing and not to execute the translated instructions from memory.

A second solution for branches inside the set of virtual machine instructions is to split the set of native instructions into parts that, if executed, are always executed implemented with the same native machine instructions and to store the native machine instructions stored for the various parts. In this case, the virtual machine interpreter 12 detects completion of the native machine instructions of each part that ends in a transfer of control instruction that is not at the end of the set of virtual machine instructions. This may be realized by monitoring the instruction addresses issued by the processor core 10, if desired in combination with the insertion of a native machine branch instruction at the end of each part to jump into the range identifying execution in the normal mode. The branch target of the native machine branch instruction may be used to identify the part that has completed. Upon completion of execution of a part, the virtual machine instruction takes care of virtual machine instructions that command transfer of control and subsequently causes the processor core to start executing from memory system 14 those native instructions that where generated for the selected part of the set of virtual machine instructions. Or, if the virtual machine instruction transfers control out of the set of instructions, normal mode execution may be resumed.

A third solution is to generate native machine instructions that implement the "transfer of control" instructions inside the set of instructions by means of appropriate native machine branch instructions between the generated native machine instructions. Thus nested loops can be realized.

The invention claimed is:

1. A data processing system for executing a program of virtual machine instructions with a processor core that is arranged to execute native instructions comprising
   the processor core;
   a memory;
   a virtual machine interpreter, comprising a hardware pre-processor including a program counter, separate from the processor core, for receiving virtual machine instructions selected dependent on program flow during execution of the program, the virtual machine interpreter being coupled to the processor core to generate native machine instructions that implement the virtual machine instructions for execution by the processor core, the virtual machine interpreter being arranged
      to identify an initial virtual machine instruction from a body of successive ones of the selected virtual machine instructions, where the body is expected to be executed repeatedly; to record a correspondence between the initial virtual machine instruction in the body and a memory location in the memory;
      to write native instructions for the body into the memory from said memory location, the native instructions for the body being generated for virtual machine instructions starting from the initial virtual machine instruction;
      to cause the processor core to execute the native instructions for the body and
      to repeat execution of the native instructions for the body by executing the written native machine instructions for the body from memory starting from said memory location.

2. A data processing system according to claim 1, the virtual machine interpreter being arranged to generate a native branch back instruction to a start of the body and placing the native branch back instruction at an end of the body in the memory.

3. A data processing system according to claim 1, the virtual machine interpreter being arranged to receive hint information, which does not affect program flow, the hint information indicating at least said initial virtual machine instruction, the virtual machine interpreter recording said correspondence and writing the native instructions for the body when program flow reaches the initial virtual machine instruction, conditional upon receiving said hint information.

4. A method of executing a program of virtual machine instructions with a processor core that is arranged to execute native instructions, the method comprising selecting, under control of program flow, virtual machine instructions to be executed;

using a hardware pre-processor, determining native instructions from the selected virtual machine instructions, to implement the selected virtual machine instructions;

for a body of successive ones of the selected virtual machine instructions that is expected to be executed repeatedly, identifying an initial virtual machine instruction of the body of successive ones of the selected virtual machine instructions;

recording a correspondence between the initial virtual machine instruction and a memory location;

writing native instructions for the body into a memory from said memory location, the native instructions for the body being determined from virtual machine instructions starting from the initial virtual machine instruction;

causing the processor core to execute the native instructions for the body and to repeat execution of the native instructions for the body by executing the written native machine instructions for the body from memory starting from said memory location; and for selected virtual machine instructions that are not expected to be executed repeatedly, providing directly to the processor core instructions to implement the selected virtual machine instructions, without storing the instructions to implement the selected virtual machine instructions in memory.

5. A method according to claim 4, comprising generating a native branch back instruction to a start of the body and placing the native branch back instruction in the memory at an end of the body of successive ones of the selected virtual machine instructions that is expected to be executed repeatedly.

6. A method according to claim 4, said identifying comprising preprocessing the program to detect loop terminating with a virtual machine branch back instruction and adding a hint to the program which identifies a target address of the virtual machine branch back instruction as the initial virtual machine instruction.

* * * * *